Figure 1:
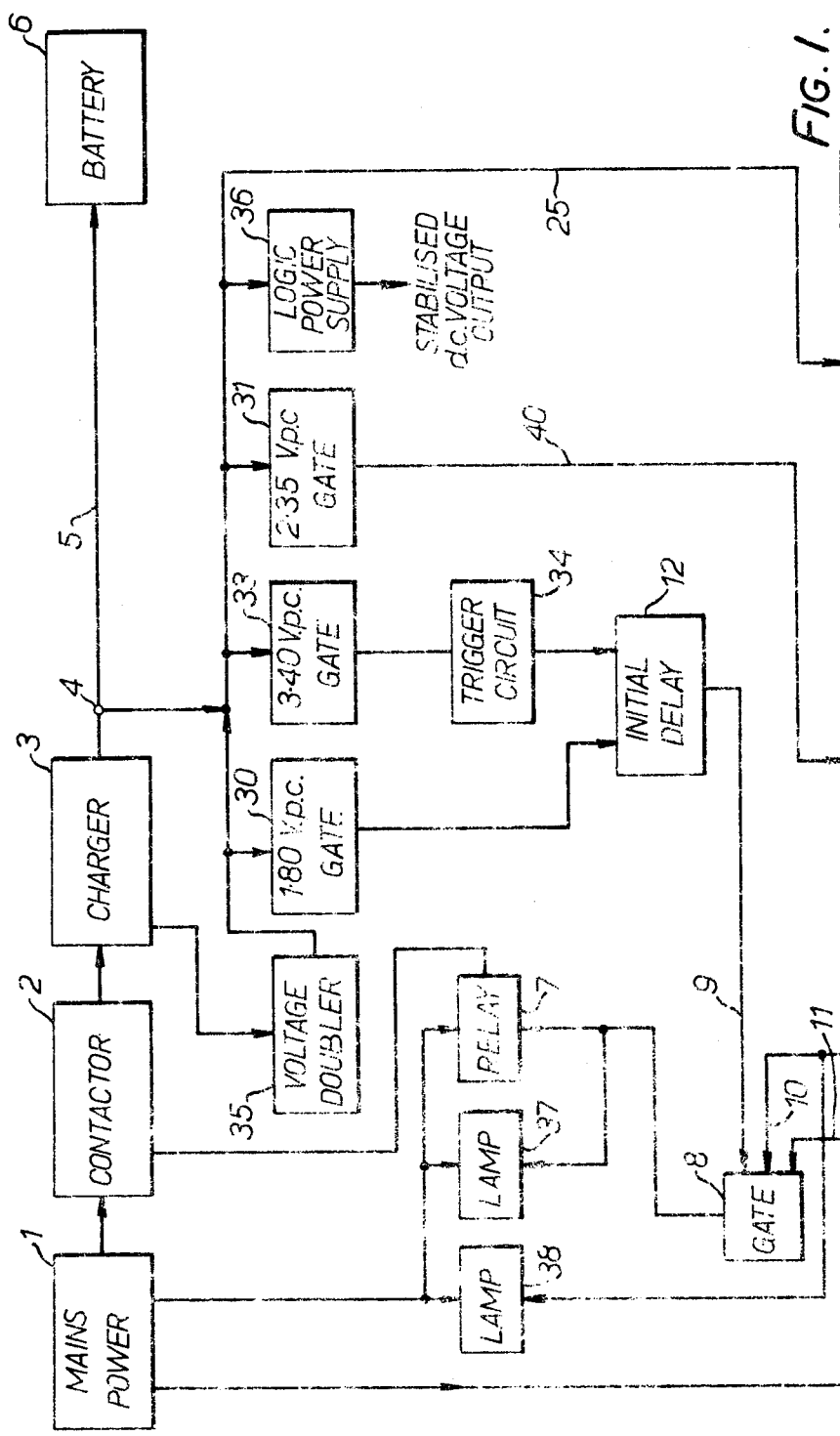

United States Patent [19]

Foster

[11] 4,091,320

[45] May 23, 1978

[54] AUTOMATIC ELECTRIC BATTERY CHARGING APPARATUS

[75] Inventor: George William Foster, Bolton, England

[73] Assignee: Chloride Group Limited, London, England

[21] Appl. No.: 715,575

[22] Filed: Aug. 18, 1976

Related U.S. Application Data

[63] Continuation-in-part of Ser. No. 552,759, Feb. 25, 1975, Pat. No. 3,979,658.

[51] Int. Cl.² .................................................. H02J 7/04
[52] U.S. Cl. .................................... 320/40; 320/37; 320/30
[58] Field of Search ....................... 320/21, 30, 23, 24, 320/39, 40, 48, 37, 38

[56] References Cited

U.S. PATENT DOCUMENTS

| | | | |
|---|---|---|---|
| 3,841,336 | 10/1974 | Daynard | 320/48 X |
| 3,886,427 | 5/1975 | Long | 320/39 X |
| 3,979,658 | 9/1976 | Foster | 320/39 X |

*Primary Examiner*—Robert J. Hickey
*Attorney, Agent, or Firm*—Watson, Cole, Grindle & Watson

[57] ABSTRACT

Automatic battery charging apparatus in which a control signal is generated by subtracting a signal representing a fraction of the mains supply voltage from the battery voltage so that the control signal represents the state of charge of the battery irrespective of variations in the mains voltage. The charge is terminated when the rate of rise of the control signal falls below a predetermined value; this condition is sensed by sampling the output frequency of a voltage controlled oscillator whose frequency is directly proportional to the control signal. In one arrangement the output frequency is fed to an up-down counter for a sampling period (2 minutes) with the counter counting up and then, after an interval of 30 minutes, the output frequency is fed to the counter for a further sampling period (1 minute 55 seconds) with the counter counting down. If the counter fails to return to zero at the end of a down count the charge is terminated.

12 Claims, 3 Drawing Figures

AUTOMATIC ELECTRIC BATTERY CHARGING APPARATUS

This application is a continuation-in-part of application Ser. No. 552,759 filed Feb. 25, 1975, now U.S. Pat. No. 3,979,658.

This invention relates to automatic battery charging apparatus, including terminating means for initiating the termination of a phase of the charge.

Many proposals have in the past been put forward for automatically terminating the charge of a battery when the battery is fully charged.

In particular the present applicants' British patent specification No. 1,097,451 describes a charger in which the initiation of termination of the charge is dependent upon the rate of rise of battery voltage, and in particular occurs when the rate of rise falls off as the battery approaches the fully charged condition. This known arrangement depends on monitoring the rise of voltage that occurs in a given time. The present applicants' U.S. Pat. No. 3,979,658 describes an arrangement including a voltage comparator arranged to compare the reference voltage with a control signal varying with battery voltage, means for repeatedly increasing the reference voltage by a step relatively to the control signal whenever the control signal exceeds the reference voltage, and means for initiating the termination when the time interval between steps exceeds a predetermined value.

According to the present invention automatic battery charging apparatus, including terminating means for terminating a phase of the charge when the rate of rise of a control signal varying with battery voltage falls below a given value, includes a voltage controlled pulse generator controlled by the control signal to produce a train of pulses whose repetition rate varies with the control signal, and means for initiating termination in response to the rate of change of the said repetition rate falling below a given value.

In one form of the invention the apparatus includes an up-down counter, means for applying trains of the pulses to the up-down counter in the up mode and the down mode alternately for pairs of counting periods of related duration, and means for initiating termination dependent on the count resulting from such a pair of trains.

Thus in a preferred arrangement a train of the pulses is applied to the counter to count in a first direction from an initial (e.g. zero) count for a first predetermined period and thereafter another train of the pulses is applied to the counter in the opposite direction for a second time period which is slightly shorter than the first time period, and enables the terminating means if the counter has not returned to its initial count (e.g. zero) by the end of the second time period. There may be an interval between the counting periods of a pair. The duration of the interval may be many times that of a counting period, for example the first counting period may be 120 seconds in the up mode followed by an interval of 30 minutes during which the count is stored after which there is a down count for 115 seconds.

In an alternative form of the invention in place of an up-down counter the apparatus includes two counters both counting in the same direction in alternate intervals, and a digital comparator for comparing the counts. In this case the duration of successive sampling intervals may be the same.

In a further alternative the voltage control pulse generator may be differently biased in alternate intervals so as to produce pulses at a slightly different frequency at a given control voltage. Here again the duration of successive sampling intervals may be the same.

The voltage controlled pulse generator may take various forms. In one convenient form it comprises an operational amplifier having a feedback capacitor with means for short-circuiting it when the output rises to a given value, to produce a sawtooth wave whose frequency varies as the control voltage. Preferably the output of the operational amplifier is passed through a differentiating circuit so as to produce a signal in the form of short pulses.

Figure 2:
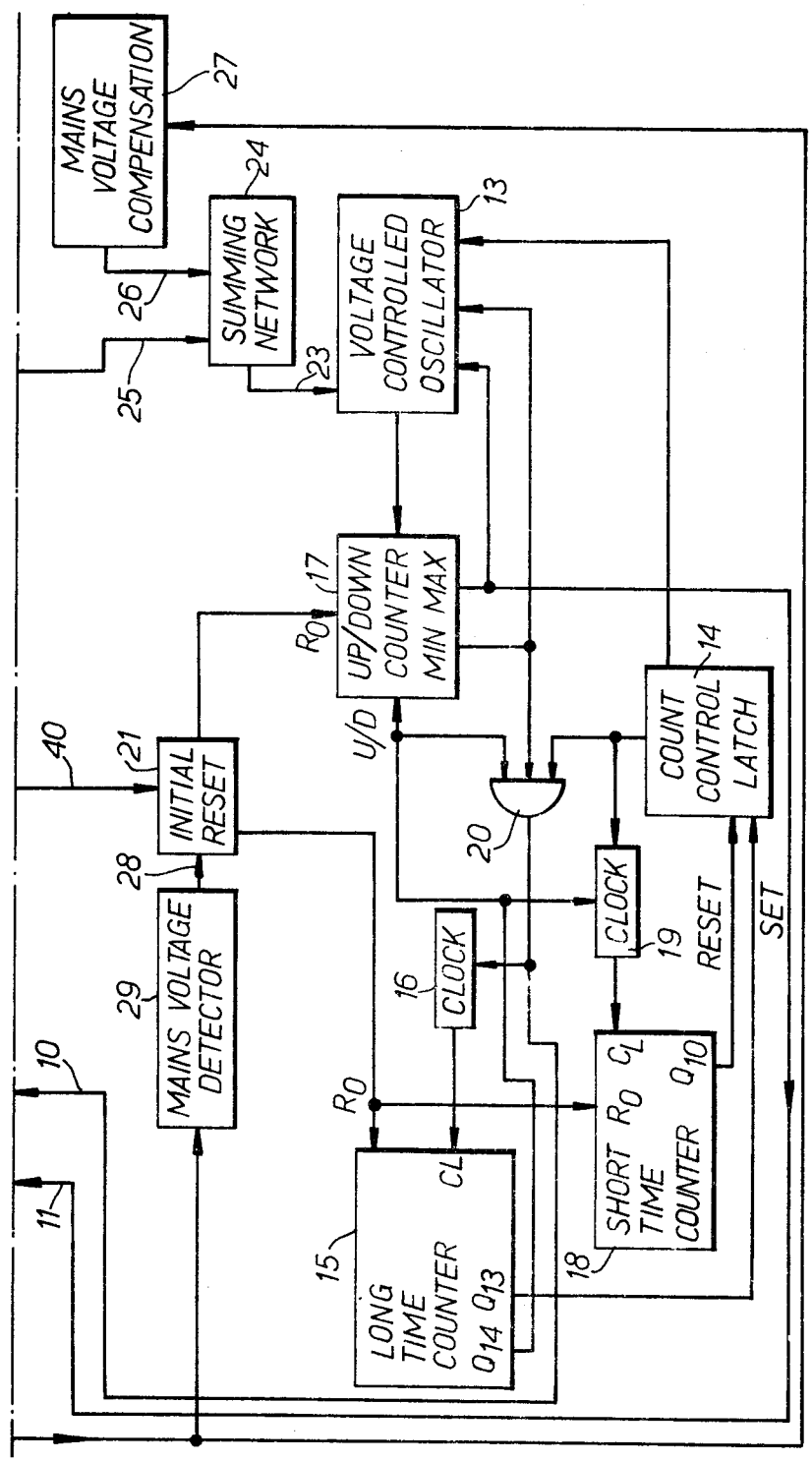

The invention may be carried into practice in various ways but one specific charger intended for charging lead-acid batteries will now be described by way of example with reference to the accompanying drawings, of which:

FIGS. 1 and 2 when taken together form a block diagram of the charger; and

Figure 3:
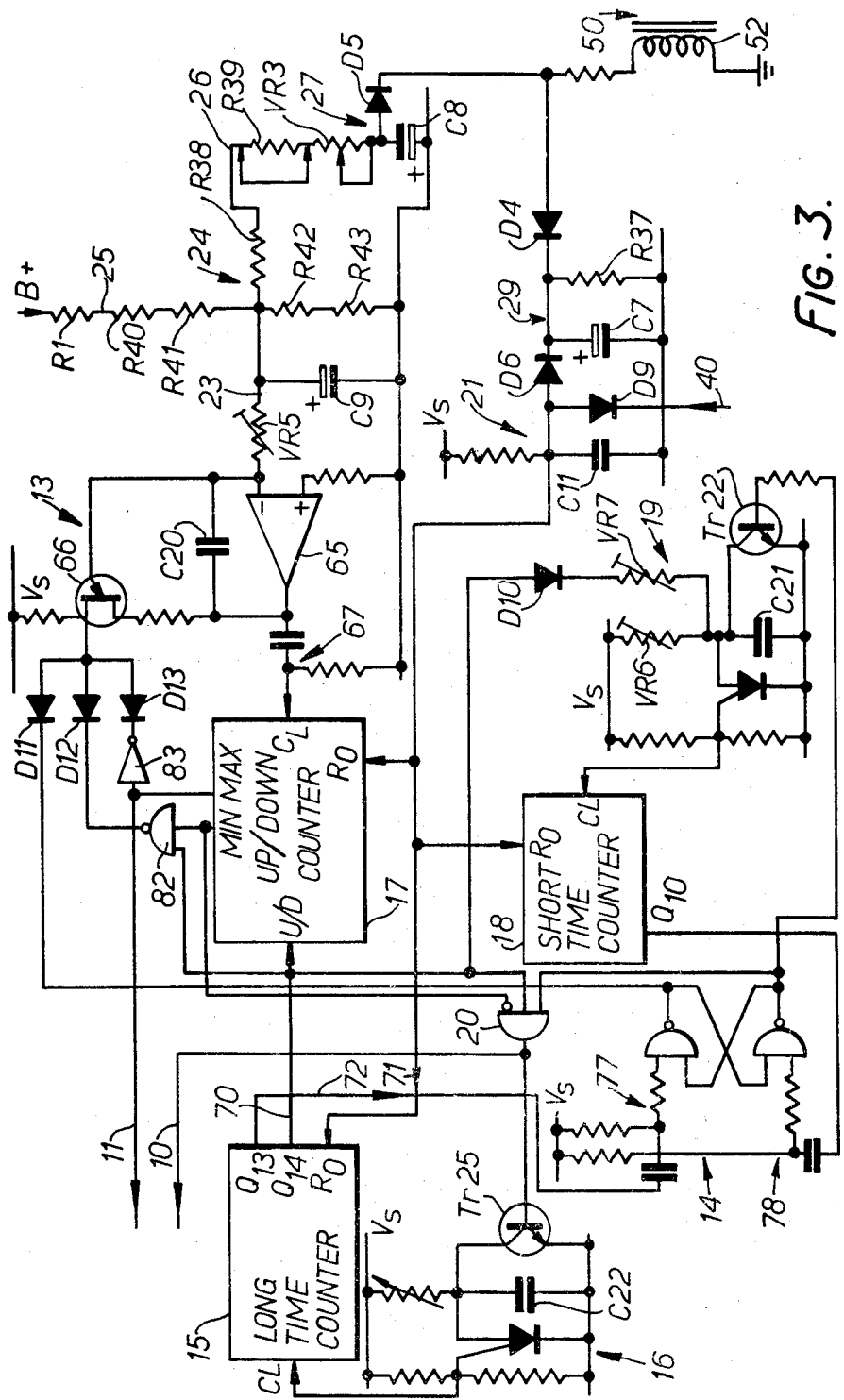

FIG. 3 is a more detailed diagram of the part of the circuit shown in FIG. 2.

The general principles of the charger are described in greater detail in the above mentioned U.S. Pat. No. 3,979,658. Briefly, the charger depends on the fact that, when using a simple taper charging circuit, the rate of rise of battery voltage decreases during the last part of the charge. The charger is arranged to terminate the charge when the rate of rise of battery voltage falls below a predetermined value. Since the rate of rise of battery voltage may also be below this value during the early part of the charge, the charger is arranged to distinguish between early parts and late parts of the charge by ascertaining whether or not the battery voltage is above 2.35 volts per cell (in the case of a lead-acid battery) and to continue the charge, even if the rate of rise of voltage is below the predetermined level, for as long as the battery voltage is below 2.35 volts per cell.

The main features of the circuit will now be described briefly with reference to the block diagram of FIGS. 1 and 2, before describing further details of the individual parts with reference to FIG. 3.

The charging circuit comprises a.c. mains supply terminals 1 supplying a.c. power through a contactor 2, to a transformer and rectifier 3, delivering direct current to charger terminals 4, and thence through the charger connecting cable 5, to the battery 6. The control circuits receive power and voltage signals from the battery 6 via the charger terminals 4. Power is also obtained from the mains for providing a mains voltage compensating unit 27 and for energising two indicating lamps 37, 38 and a relay 7. The latter provides a pair of isolated contacts for switching a.c. power to the coil of the contactor 2. A further input signal is obtained from the secondary winding of the charger transformer and is fed to a voltage doubler 35 to provide an increased d.c. voltage at the charger terminals 4 to switch off the charger when the battery 6 is disconnected.

When a battery is connected to the charger terminals the controller logic circuits receive power from it at substantially constant voltage Vs via a stabilizing unit 36, and begin to perform their respective functions. A gate 30 determines whether or not the battery voltage is above the equivalent of 1.80 volts per cell (in the case of a lead-acid battery) for the number of cells for which the charger is designed. If it is below 1.80 volts per cell the charger does not switch on. If it is above 1.80 volts per cell an initial delay 12 is allowed to expire and the charger switches on at the end of this delay. The switch-on occurs when the initial delay signal 9 disappears from the input of a gate 8 whose output then rises to switch on the relay 7 and the lamp 37.

During the course of the charge, a mains compensating signal 26 from the unit 27 is subtracted from a battery signal 25 in summing network 24 to provide a control signal 23.

The control signal 23 is supplied to a voltage-controlled oscillator 13, which, when it is not disabled by signals yet to be described, generates a train of pulses at a frequency which is directly proportional to the control signal voltage 23. The primary disabling signal is removed for a period of about 2 minutes at intervals of about 30 minutes. The 30 minute intervals are timed by a long time counter 15 which is driven by a clock generator 16 at constant frequency throughout the charging period. Its output Q13 causes a pulse to be set about every 30 minutes to set a latch 14 to start the voltage controlled oscillator 13.

The duration of each operating period of the oscillator 13 is determined by a short time counter 18, which is driven by a clock generator 19. The clock generator 19 is disabled by a signal from the timing control latch 14 whenever the oscillator 13 is also so disabled. When the latch 14 is set to allow the oscillator 13 to run, the short time counter 18 begins to count clock pulses from the clock generator 19. After about 2 minutes (or slightly less as described below) the short time counter reaches its maximum count and then returns to zero, and at this time causes a resetting pulse to be sent to the timing control latch 14, so that both the oscillator 13 and the clock generator 19 are disabled until the latch 14 is set again 30 minutes later by a signal from the long time counter 15.

The pulses generated by the voltage controlled oscillator 13 are supplied to the clock input of an up/down counter 17. The long time counter 15 also supplies up/-down count control signals for the up/down counter 17 which is thereby made to count up during every other period of operation of the oscillator 13, and down during the intervening operating periods.

The up/down control signal provided the long time counter 15 also serves to modify the frequency of the clock generator 19 so that the pulse repetition rate during a down count is slightly higher than during an up count. The effect of this charge is to decrease the duration of the down counting period; the down counting period might be 1 minute 55 seconds, in comparison with 2 minutes for the up counting period. Since the pulses produced by the voltage controlled oscillator 13 are repeated at a rate directly proportional to the control voltage, the difference in the counting period means that, assuming the up/down counter 17 to be at zero before an up count begins, the counter will have returned to zero at the end of the following down count only if the control voltage has risen by more than about 4.2% in the 30 minute interval operating the two counts. Provided that the counter does return to zero, indicating that such a voltage rise has ocurred, the charge is continued. The voltage controlled oscillator 13 is disabled as soon as the counter 17 returns to zero on a down count, so that it cannot count below zero, and is ready for the next up count.

If the counter 17 fails to return to zero at the end of a down count, the charge is terminated. To detect this condition, the up/down control signals, a signal from the timing control latch 14 and a 'zero count' signal from the up/down counter 17 are combined in a gate 20, which supplies a signal 10 to the gate 8 to switch off the relay 7 and the lamp 37 and thus stop the charge. At the same time the signal 10 switches on the lamp 38, and disables the clock generator 16 so that the charger remains in this state until the battery 6 is disconnected.

The rate of rise of the control signal voltage 23 during the early part of a charge may be so low that the counter 17 would not return to zero at the end of a down count during this part of the charge. This would result in a premature termination of the charge, and therefore the counters 15, 17 and 18 are held at zero until the battery voltage has risen above 2.35 volts per cell. This condition is sensed by a gate 31 which then removes an inhibiting signal from a line 40 which leads to an initial reset 21 which produces a reset signal until the inhibiting signal 40 is removed. The re-set signal is applied to reset inputs of the counters 15, 17 and 18.

The charge is also terminated if the up/down counter 17 reaches its maximum count indicating that the control signal voltage 23 is outside the range of the counter 17. Under these conditions, a 'maximum count' signal is supplied over a line 11 to the gate 8 to stop the charge, and also disables the voltage-controlled oscillator 13, so that the charger remains in this state until the battery 6 is disconnected.

Arrangements are also made to ensure that the counters 15, 17 and 18 will not operate unless mains voltage is being supplied to the charger. Thus, a mains voltage detector 29 is connected to the initial reset 21 by a line 28 to ensure that the counters do not start to count until mains voltage is present, and also begin fresh counts if the mains supply is interrupted.

If at any time during the charge the battery is disconnected, the peak voltage at the charger terminals rises above 3.4 V.p.c. due to the voltage waveform impressed from the voltage doubler 35. A gate 33 responds to this condition and trips a trigger circuit 34 to re-activate the initial delay 12. The initial delay signal 9 reappears to cause the gate 8 to open the relay 7 and thus open the contactor 2 to switch off the charger.

Certain parts of the circuit will now be described in greater detail, with reference to FIG. 3. The remaining parts of the circuit are largely conventional; if detailed description is required, reference may be made to our above-mentioned U.S. Pat. No. 3,979,658, since these parts are largely identical to the corresponding parts of the charger described in detail therein.

As mentioned above, signals 10 and 11 are applied to the gate 8 which controls the relay 7. Both signals remain in the "0" state during the course of a charge. Signal 10 changes to the "1" state to stop the charge when the charger terminal voltage is above 2.35 V.p.c. and the rise of the battery voltage 23 in a 30 minute interval is less than about 4.2%. Signal 11 changes to the "1" state to stop the charge if the counting range of the up/down counter 17 is exceeded.

The control voltage 23 represents the algebraic sum of a 3-cell battery voltage sample and a rectified and smoothed sample of the a.c. mains voltage. The two are added together in the summing network 24. The battery voltage is sampled across the potential divider comprising the resistors R1 and R40 to R43, which are weighted to give a value of 20 kilohms per cell. The mains voltage compensating sample is obtained from an auxiliary secondary winding 52 of the transformer 50 (also shown in FIG. 3). This is half-wave rectified by a diode D5 and smoothed by a capacitor C8. The polarity of recfification is chosen so that the mains compensating voltage is of opposite polarity to the battery voltage sample. The mains compensating voltage is connected to the 3-cell sample point on the battery potential divider via resistors R38, R39 and an adjustable resistor VR3. The current through the lower potential divider resistors R42, R43 due to the mains compensating voltage flows in the opposite direction to that due to the battery voltage. Thus the voltage drop across the resistors R42, R43, which provides the control voltage, is reduced by an amount determined by the value of the secondary voltage of the transformer 50 and the setting of the adjustable resistor VR3. The control voltage is initially set to 4.5 V for specified battery and mains voltage of 2.60 V.p.c. and 230V respectively. Smoothing of the control voltage is provided by a capacitor C9.

The voltage controlled oscillator 13 is a relaxation oscillator, consisting of an operational amplifier 65 connected as an integrator and a unijunction transistor 66 acting as the relaxation element. The control signal 23 is applied to the operational amplifier through an input resistor VR5, which can be adjusted to vary the frequency of the oscillator, and, until the unijunction transistor 66 fires, a ramp voltage appears across a feedback timing capacitor C20; the input side of the capacitor is held close to the ground potential while at the output side the ramp voltage is negative-going. The emitter and base-1 of the transistor 66 are connected across the capacitor C20, while its base-2 is connected to $V_s$, so that when the voltage across the capacitor C20 reaches the peak point voltage of the transistor 66 the transistor 66 fires and discharges the capacitor C20. The output of the oscillator 13 therefore produces a sharp positive-going edge at this moment and this is differentiated by an R-C network 67 to produce a short positive-going clock pulse, which is applied to the clock input of the counter 17.

The various disabling signals applied to the oscillator 13 act by reducing the base-2 voltage of the transistor 66 almost to ground voltage, so that the transistor is permanently on, short-circuiting the capacitor C20. As mentioned above, the primary disabling signal is produced by the control latch 14 which consists of a pair of NAND-gates. The 'set' signals for the latch 14 are derived from the Q13 output of the longtime counter 15, which is a 14 stage binary counter. Negative-going transitions of the Q13 output occur at intervals of about 30 minutes and are transmitted over a line 72 to a differentiating R-C network 77, so that the "set" input voltage to the latch 14 is reduced from 9v, which is its normal value, and the latch is set. Positive going transitions do not switch the latch.

As soon as the latch 14 has been set, the clock generator 19 begins to run, and steps the short time counter 18. The clock generator 19 is basically a simple programmable unijunction transistor oscillator, using a timing capacitor C21 and an adjustable timing resistor VR6. To allow the clock generator to be disabled during the periods when counting is not required, a transistor Tr22 is connected across the timing capacitor C21 and is turned on by a signal from the latch 14, whenever the latch is in the "reset" position. To allow the frequency of the clock generator 19 to be increased slightly during down counting periods, a further adjustable timing resistor VR7 is connected to feed the timing capacitor C21. This resistor is connected through a blocking diode D10, to the Q14 output of the counter 15 so that when the counter output is high, the resistors VR6 and VR7 are effectively in parallel, but when the counter output is low, no current can flow in the resistor VR7. The Q14 output of the long time counter 15 also controls the up/down count control input of the counter 17. Thus since Q14 changes state at each negative-going transition of the Q13 output, successive counts of the counter 17 will be in opposite directions and the frequency of the clock generator will be slightly higher during the down count.

The short-time counter 18 is a 10 stage binary counter so that with the clock generator 19 running at about 8 pulses per second, the Q10 output of the counter will produce a negative going transition about 2 minutes after counting starts. This output is passed through a differentiating R-C network 78, similar to the network 77, to the "reset" input of the latch 14, so that the latch is reset and the oscillator 13 and the clock generator 19 are disabled again until 30 minutes has elapsed.

As mentioned previously, a signal on the line 10 to terminate the charge is produced if the counter 17 does not return to zero during a down count. This signal is produced by the AND-gate 20 which takes its inputs from the latch 14, the up/down control line 70, and the "zero count" output of the counter 17.

As also mentioned previously, the oscillator 13 is disabled if the counter 17 reaches zero on a down count; in this case, the disabling signal is produced by a NAND-gate 82 which receives the up/down count signal and the "zero count" signal as inputs. The oscillator is also disabled by a "maximum count" signal from the counter 17, which is supplied through an inverter 83. All three disabling signals are applied to base-2 of the transistor 66 through diodes D11 to D13, which prevent a low base-2 voltage from being fed back along the disabling lines.

The clock generator 16, which drives the long time counter 15, is also basically a simple programmable unijunction transistor oscillator. To allow the generator to be disabled when a charge has been terminated, a transistor Tr 25 is connected across the timing capacitor C22 of the oscillator, and is turned on when the termination signal 10 appears. The clock generator 16 runs at about 4 pulses per second so that the long time counter 15 will run through a complete cycle in about an hour.

The initial reset 21 consists of an R-C combination which provides an output voltage which starts at zero immediately after the voltage $V_s$ appears, but, so long as the mains voltage is present and the battery voltage is above 2.35 volts per cell, rises fairly quickly to 9v. The output is applied to reset inputs of the counters 15, 17 and 18, and resets these as long as the voltage is below about 3v, but allows them to count as soon as the reset voltage rises above about 6v. However, if the mains voltage is absent, as indicated by the mains voltage detector 29, or the battery voltage is less than 2.35 volts per cell, the reset signal is prolonged for as long as either of these conditions obtains. The prolongation is necessary in the absence of the mains voltage because the control voltage 23 will cause the frequency of the oscillator 13 to rise so high that the counter 17 will otherwise reach maximum count.

The mains voltage detector circuit 29 consists of a resistor R37 which shunts the timing capacitor C11, of fthe initial reset 21 through a diode D6. The latter is normally reverse baised by a voltage applied from the auxiliary secondary winding 52 of the transformer 50 through a diode D4 and smoothed by a capacitor C7. Removal of the mains voltage causes the diode D6 to become forward biased and the shunting effect of the resistor R37 is presented to the timing capacitor C11, to stop the reset voltage rising.

The signal on the line 40 is similarly applied to the timing capacitor C11 through a diode D9; the diodes D6 and D9 prevent a low voltage on the line 71 from being fed back to the capacitor C7 or the line 40.

It is believed that the operation of the charger will be clear from the detailed description of its arrangement in conjunction with the general remarks on the features of the invention.

What we claim is:

1. Automatic battery charging apparatus, including terminating means for terminating a phase of the charge when the rate of rise of a control signal varying with battery voltage falls below a given value, including a voltage-controlled pulse generator controlled by the control signal to produce a train of pulses whose repetition rate varies with the control signal, and means for initiating termination in response to the rate of change of the said repetition rate falling below a given value.

2. Apparatus as claimed in claim 1 in which the voltage-controlled pulse generator comprises an operational amplifier having a feedback capacitor with means for short-circuiting it when the output rises to a given value, to produce a sawtooth wave whose frequency varies as the control voltage.

3. Apparatus as claimed in claim 2 including a differentiating circuit through which the output of the operational amplifier is passed so as to produce a signal in the form of short pulses.

4. Apparatus as claimed in claim 1 including an up-down counter, means for applying trains of the pulses to the up-down counter in the up mode and down mode alternately for pairs of counting periods of related duration, and means for initiating termination dependent on the count resulting from such a pair of trains.

5. Apparatus as claimed in claim 2 including means for differently biassing the voltage controlled pulse generator in alternate intervals so as to produce pulses at a slightly different frequency at a given control voltage, the duration of successive counting intervals being the same.

6. Apparatus as claimed in claim 4 including means for applying a train of pulses to the counter to count in a first direction from an initial (e.g. zero) count for a first predetermined period and thereafter applying another train of the pulses to the counter in the opposite direction for a second time period which is slightly shorter than the first time period, and enabling the terminating means if the counter has not returned to its initial count (e.g. zero) by the end of the second time period.

7. Apparatus as claimed in claim 1 including two counters both counting in the same direction in alternate intervals, and a digital comparator for comparing the counts, the duration of successive sampling intervals being of the same.

8. Apparatus as claimed in claim 6 in which there is an interval between the counting periods of a pair.

9. Apparatus as claimed in claim 8 in which the duration of the interval is many times that of a counting period.

10. Apparatus as claimed in claim 1 in which the control signal also varies with the voltage of the power supply to the charger.

11. Apparatus as claimed in claim 1 in which termination of the phase of the charge in response to the said rate of change falling below the given value is inhibited until the battery voltage rises above a predetermined value.

12. Apparatus as claimed in claim 11 for charging lead-acid batteries, in which the predetermined vaue is 2.35 volts per cell.

* * * * *

UNITED STATES PATENT OFFICE
CERTIFICATE OF CORRECTION

PATENT NO. : 4,091,320
DATED : May 23, 1978
INVENTOR(S) : George William Foster

It is certified that error appears in the above-identified patent and that said Letters Patent are hereby corrected as shown below:

[30]  FOREIGN APPLICATION PRIORITY DATA

August 20, 1975          Great Britain........34611/75

Signed and Sealed this

Sixth Day of March 1979

[SEAL]

Attest:

RUTH C. MASON
*Attesting Officer*

DONALD W. BANNER
*Commissioner of Patents and Trademarks*